United States Patent
Klein et al.

(10) Patent No.: US 9,596,270 B2
(45) Date of Patent: Mar. 14, 2017

(54) SECURE XDM COMMUNICATION BETWEEN IMS NETWORKS

(75) Inventors: Mikael Klein, Huddinge (SE); Christer Boberg, Tungelsta (SE); Anders Lindgren, Alvsjo (SE); Ingemar Lindgren, Alvsjo (SE); Gert Oster, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 717 days.

(21) Appl. No.: 13/509,775

(22) PCT Filed: Nov. 16, 2009

(86) PCT No.: PCT/EP2009/065258
§ 371 (c)(1),
(2), (4) Date: Oct. 18, 2012

(87) PCT Pub. No.: WO2011/057678
PCT Pub. Date: May 19, 2011

(65) Prior Publication Data
US 2013/0031257 A1    Jan. 31, 2013

(51) Int. Cl.
 G06F 15/16    (2006.01)
 H04L 29/06    (2006.01)
 H04L 29/08    (2006.01)

(52) U.S. Cl.
 CPC ...... H04L 65/1016 (2013.01); H04L 65/1006 (2013.01); H04L 67/02 (2013.01);
(Continued)

(58) Field of Classification Search
None
See application file for complete search history.

(56) References Cited

U.S. PATENT DOCUMENTS

2008/0256117 A1* 10/2008 Laurila .................. H04L 67/02
2009/0052413 A1    2/2009 Boyacigiller et al.
(Continued)

FOREIGN PATENT DOCUMENTS

| CN | 101127951 A | 2/2008 |
| CN | 101175329 A | 5/2008 |
| CN | 101385295 A | 3/2009 |

OTHER PUBLICATIONS

Alliance, Open Mobile. "XML Document Management (XDM) Specification." Sep. 16, 2008.*
(Continued)

Primary Examiner — Chris Parry
Assistant Examiner — Caroline Jahnige
(74) Attorney, Agent, or Firm — Myers Bigel, P.A.

(57) ABSTRACT

Requests between first and second IMS network domains are communicated by receiving an XDM request in the first domain. The XDM request relates to an XML document that can be accessed via the XDM request from a location in the second domain. A SIP request is created that includes information identifying it as a request that relates to an XDM request. The SIP request is sent to the second domain so that the SIP request can be routed to the location in the second domain based on the identifying information in the SIP request. A connection for XDM requests between the first and second domains is established.

13 Claims, 8 Drawing Sheets

(52) U.S. Cl.
CPC .......... *H04L 63/10* (2013.01); *H04L 65/1063* (2013.01); *H04L 65/1069* (2013.01); *H04L 67/14* (2013.01); *H04L 69/08* (2013.01)

(56) References Cited

U.S. PATENT DOCUMENTS

| | | | |
|---|---|---|---|
| 2009/0279455 A1* | 11/2009 | Wang et al. .................. | 370/260 |
| 2010/0325225 A1* | 12/2010 | Petronijevic ........ | H04L 67/2804 709/206 |
| 2011/0214051 A1* | 9/2011 | Petronijevic et al. ........ | 715/255 |

OTHER PUBLICATIONS

Campbell, B., and R. Mahy. C. Jennings, The Message Session Relay Protocol (MSRP). RFC 4975, Sep. 2007.*

PCT International Search Report, mailed Aug. 13, 2010 for PCT International Application No. PCT/EP2009/065258, filed on Nov. 16, 2009.

Bertin "Integrating IMS with Web Services to Enable IP Multimedia Service Oriented Architectures" Internet Multimedia Services Architecture and Applications, 2008, IMSAA 2008, $2^{nd}$ International Conference on, IEEE, Piscataway, New Jersey, USA, Dec. 10, 2008, pp. 1-4.

Maarabani et al. "Interoperability Testing of Presence Service on IMS Platform" Testbeds and Research Infrastructures for the Development of Networks & Communities and Workshops, 2009, Tridentcom 2009, $5^{th}$ International Conference on, IEEE, Piscataway, New Jersey, USA, Apr. 6, 2009, pp. 1-6.

Chinese Office Action Corresponding to Chinese Patent Application No. 200980162463.5; Date Mailed: Apr. 2, 2014; English Translation Thereof, 6 Pages.

Zhenye, Yu, "XCAP Application Usage in SIP/SIMPLE Presence System", China's Science and Technology Papers Online, Feb. 13, 2008, 11 pages.

Shengli, Zhang, "Application of XCAP in IP Multimedia Subsystem", China's Science and Technology Papers Online, Feb. 10, 2009, 8 pages.

Runxin, Yang, "The Design and Implementation of Instant Messaging Server Base on IMS", China's Science and Technology Papers Online, Sep. 11, 2009, 15 pages.

* cited by examiner

SECURE XDM COMMUNICATION BETWEEN IMS NETWORKS

CROSS-REFERENCE TO RELATED APPLICATION

This application is a 35 U.S.C. §371 national stage application of PCT International Application No. PCT/EP2009/065258, filed on Nov. 16, 2009, the contents of which are incorporated by reference herein as if set forth in their entirety. The above-referenced PCT International Application was published in the English language as International Publication No. WO 2011/057678 on May 19, 2011.

TECHNICAL FIELD

The present invention relates to a method and apparatus for use with accessing XML (Extensible Mark-up Language) Document Management between IMS networks.

BACKGROUND

The Open Mobile Alliance (OMA) sets out the XML Document Management (XDM) Architecture (see OMA XDM 2.0). This defines a common mechanism that makes user-specific service-related information accessible to the service enablers that need them. Such information is expected to be stored in the network where it can be located, accessed and manipulated (e.g. created, changed, deleted, etc.). XDM specifies how such information will be defined in well-structured XML documents, as well as the common protocol for access and manipulation of such XML documents.

Documents are accessed and manipulated via the common protocol XCAP, XML Configuration Access Protocol [see IETF RFC 4825 "The Extensible Markup Language (XML) Configuration Access protocol (XCAP)", J. Rosenberg, May 2007, URL: http://www.ietf.org/rfc/rfc4825.txt]. XDM provides an architecture for managing service specific data and defines a common mechanism that makes user-specific service-related information accessible to the service enablers that need them. The service-s ecific information is expressed and exchanged by means of XML documents, and this information is stored in the network in logical repositories called XDMSs (XDM Servers). Each repository may be associated with a functional entity which uses its data to perform its functions. Each XML document stored in an XDMS is described as an XCAP Application Usage, which enables applications to use the document via XCAP.

FIG. 1 of the accompanying drawings illustrates some of the network entities defined in the above-referenced OMA Architecture Document. In FIG. 1, two XDM Clients 2-1 and 2-2 are in communication with respective different XDM Servers 6-1 and 6-2 via an Aggregation Proxy 4. The XDM Clients 2-1 and 2-2 are client entities that provide access to the various XDMS features. They provide an end user with the possibility to create, modify or delete an XML document, and by that create, modify or delete service specific data. The Aggregation Proxy 4 is the contact point for the XDM Clients 2-1 and 2-2 to access XML documents stored in any XDM Server; the Aggregation Proxy 4 performs functions like authentication or routing of requests. The XDM Servers 6-1 and 6-2 hold the service specific data, and implement the procedures to create, modify or delete such data.

The IP Multimedia Subsystem (IMS) is the technology defined by the Third Generation Partnership Project (3GPP) to provide IP Multimedia services over mobile communication networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, the IMS introduces additional functionality for e.g. subscription handling, security and charging to allow operators and service providers to control user access to services and to charge users accordingly.

FIG. 2 illustrates schematically how the IMS 22 fits into the mobile network architecture in the case of a GPRS/PS access network. Call/Session Control Functions (CSCFs) 24 operate as SIP proxies within an IMS core network 22a. A user accesses the IMS 22 via an access network and gateway nodes in a connectivity layer 26. A Home Subscriber Server HSS 28 keeps a log of users' subscription profiles that define the services that the user has subscribed to. After registering, the user is able to establish a communication session with other peers, making use of the multimedia capabilities of the IMS. The IMS also includes a service network 22b, in which Application Servers (ASs) 28 are provided for implementing IMS service functionality.

The 3GPP architecture defines three types of CSCFs: the Proxy CSCF (P-CSCF) which is the first point of contact for the user within the IMS core network 22a; the Serving CSCF (S-CSCF) controls the provision of services to the users in accordance with the user's subscription; and the Interrogating CSCF (I-CSCF) whose role is to identify the correct S-CSCF, based on the user's subscription profile which it obtains from the user's HSS 26, and to forward to that S-CSCF a request received from a SIP terminal via a P-CSCF.

FIG. 3 shows in more detail the XML Document Management Architecture as defined in the OMA-AD-XDM-V2_0-20090810-C document. The Aggregation Proxy 34 of FIG. 3 is the contact point for the XDM Client 2 to access XML documents stored in any XDMS. In this OMA-defined XDM solution it would be possible to fetch XML documents and search for information in XML documents in another operator's domain using an NNI (Network-to-Network Interface). The traffic to the remote network is routed via a Cross-Network Proxy entity 36a to the remote network. The protocol used is HTTP over some secure transport, such as for example TLS (Transport Layer Security). The requesting network requires some kind of service agreement with the remote network in order to be accepted by the remote network.

A Cross-Network Proxy 36b of the remote network of FIG. 3 is the contact point for a trusted network to access XML documents stored in any XDMS of the remote network. The NNI-I interface of FIG. 3 is between the Cross-Network Proxy 36a and the Cross-Network Proxy 36b of the remote network. The protocol for the NNI-1 interface is XCAP.

For normal SIP traffic, for instance when a user in an originating IMS network calls another user belonging to a different, remote IMS network, the SIP message is routed via the IMS Core of the originating network to an interconnection gateway node N-SBG (Network-Session Border Gateway). The N-SBG is responsible (among other things) for establishing a secure tunnel between the different networks. When the S-CSCF in the originating network has completed the originating services it will perform a DNS lookup of the domain address of the Request-URI in the SIP message and find the address of the I-CSCF of the remote network. The SIP message is then routed via the N-SBG to the remote side through the secure connection (normally IPSec).

For XCAP (HTTP) traffic as defined in OMA XDM 2.0 the procedure is quite different. If a user wants to access or retrieve an XML document (for example a picture) from another user in a different, remote network, the request is routed via the Aggregation Proxy (AP) to a Cross-Network Proxy (CNP), both in the originating network, and then to a CNP in the remote network. The CNP is defined as a HTTP Proxy (configured as a reversed proxy) and is responsible for checking that the remote network is a trusted network. The same procedure also applies when a request is received at the CNP in the remote network. OMA XDM 2.0 also states that the CNP is responsible for securing the data transfer CNP:s using TLS etc., but says no more about how this may be implemented.

Thus XCAP has its own way of defining the communication over the NNI and this has to be dealt with at two network locations (N-SBG and CNP). Also, as currently defined, the XCAP messages are sent between the networks over the NNI using a security mechanism that has to be established specially for HTTP/XCAP traffic. This makes the configuration of the system more complicated and introduces more potential sources for errors. Also, some networks, for example networks that operate over large geographic areas, are divided into regions or provinces each operating as a local or sub-network and use NNIs both between different operator networks, and also between their own regional sub-networks. Such a large number of NNIs, and the need to establish HTTP/XCAP security mechanisms for each places a severe burden on the system configuration.

Note, however, that XCAP messages are only one type of request to be handled and specified in the new OMA XDM 2.1 standard. Other HTTP-based OMA XDM requests include XDM Search requests and commands that use XML Document Command Protocol.

A method of simplifying the configuration of the CNP node is described in WO2009/068114. In this document it is suggested that the DNS is provisioned with the CNP XCAP root address of the remote network. However, the other problems referred to above remain.

It is therefore desirable to address these issues.

SUMMARY

In one aspect a method of communication for XDM requests between first and second IMS network domains is presented. An XDM request is received in the first domain, the XDM request relating to an XML document that can be accessed by means of the XDM request from a location in the second domain. A SIP request is created, the SIP request including information identifying it as a request that relates to an XDM request. The SIP request is sent to the second domain so that the SIP request can be routed to said location in the second domain, based on the identifying information in the SIP request. Thereby a connection for XDM requests between the first and second domains is established.

It is an advantage that the benefits of the SIP routing principles can be used to find the remote network entity (CNP/AP/XDMS) to send the XDM request to. As SIP is used there is no need to establish a separate security mechanism for HTTP/XDM traffic over the NNI.

In one embodiment, the SIP request is a SIP INVITE comprising a request to establish a SIP session and wherein the XDM request is sent to the second domain after the SIP session has been established. The SIP session established may utilise a secure communication tunnel for SIP signalling between the first and second domains. The secure communication tunnel may be one of: an XCAP/XDM tunnel between Cross-Network-Proxy nodes in each of the first and second domains; a TCP tunnel; an IPsec tunnel; an SSH tunnel; an MRSP tunnel; and any other tunnel that is capable of carrying an XCAP request.

In another embodiment the SIP request is a SIP MESSAGE that does not comprise a request to establish a SIP session, and wherein the XDM request is embedded in the SIP MESSAGE. The information identifying the SIP MESSAGE as a request that relates to an XDM request may comprise a feature tag. The XDM request may be extracted from the SIP MESSAGE in the second domain and forwarded to the location in the second domain from which the XML document can be accessed.

In embodiments, the SIP request may include an identifier of an owner of the XML document. The SIP request may further comprise an IMS service indicator indicating that the SIP request relates to an XDM request.

The method may further comprising retrieving the XML document and returning it to the first domain in an XDM response.

In embodiments, the XDM request received in the first domain may be forwarded to a CNP in the first domain, the CNP creating the SIP request. The location in the second domain from which the XML document can be accessed, and to which the SIP request is routed may be a CNP. Alternatively, the location in the second domain to which the SIP request is routed may be an AP or an XDMS.

In another aspect a node of an IMS network is presented. The node includes a receiver for receiving an XDM request relating to an XML document that can be accessed by means of the XDM request from a location in another IMS network. A processor creates a SIP request, wherein the SIP request includes information identifying it as a request that relates to an XDM request. A transmitter sends the SIP request to the other IMS network.

In one embodiment, the node is configured to create a SIP INVITE to establish a SIP session with the location in the other IMS network, and to send the XDM request to the location once the SIP session has been established.

In another embodiment, the SIP request is a SIP MESSAGE, the processor being configured to embed the XDM request into the SIP MESSAGE.

In another aspect a node of an IMS network is presented. The node includes a receiver for receiving a SIP MESSAGE from another IMS network. The SIP MESSAGE carries an XDM request to access an XML document from a location in the IMS network. A transforming module extracts the XDM request from the SIP MESSAGE. A transmitter forwards the XDM request to the location to access the XML document.

In another aspect a node of an IMS network is presented. The node includes a receiver for receiving a SIP INVITE to establish a SIP session with another IMS network. The SIP INVITE relates to an XDM request from the other network to access an XML document. The receiver also receives the XDM request after the session has been established. A processor module is configured to respond to the SIP INVITE so as to set up the SIP session. A transmitter forwards the XDM request to access the XML document.

DETAILED DESCRIPTION

In the discussion that follows, the requests are referred to as XCAP requests. However, as noted above, other types of request are also specified in the new OMA XDM 2.1 standard, and it will be appreciated that the principles described may be used just as readily for these other types of requests. All such requests are referred to hereafter as XDM requests.

The embodiments described below make use of the standard SIP NNI routing principles in order to find the CNP in the remote network. This may involve establishing a dialog session within which the XCAP message is sent. Alternatively, the XCAP request may be sent via a secure tunnel in a stand-alone SIP MESSAGE request without establishing a session.

The system is configured such that when an XCAP request is received from a user in a first IMS network domain (the originating network) to access an XML document in a second IMS network domain (the remote network), the CNP in the originating network creates a SIP request which is sent to the remote network using standard SIP routing. In this way the CNP in the remote network can be found using SIP so that the XCAP request can be sent to it. The XCAP request is then forwarded to the appropriate location in the remote network to access the XML document. Note that accessing the document, as referred to herein, may involve retrieving the XML document from the remote XDMS (i.e. sending the document back to the requesting user) or may, for example, involve accessing the document for some other purpose, such as searching, without actually retrieving the XML document.

Figure 1:
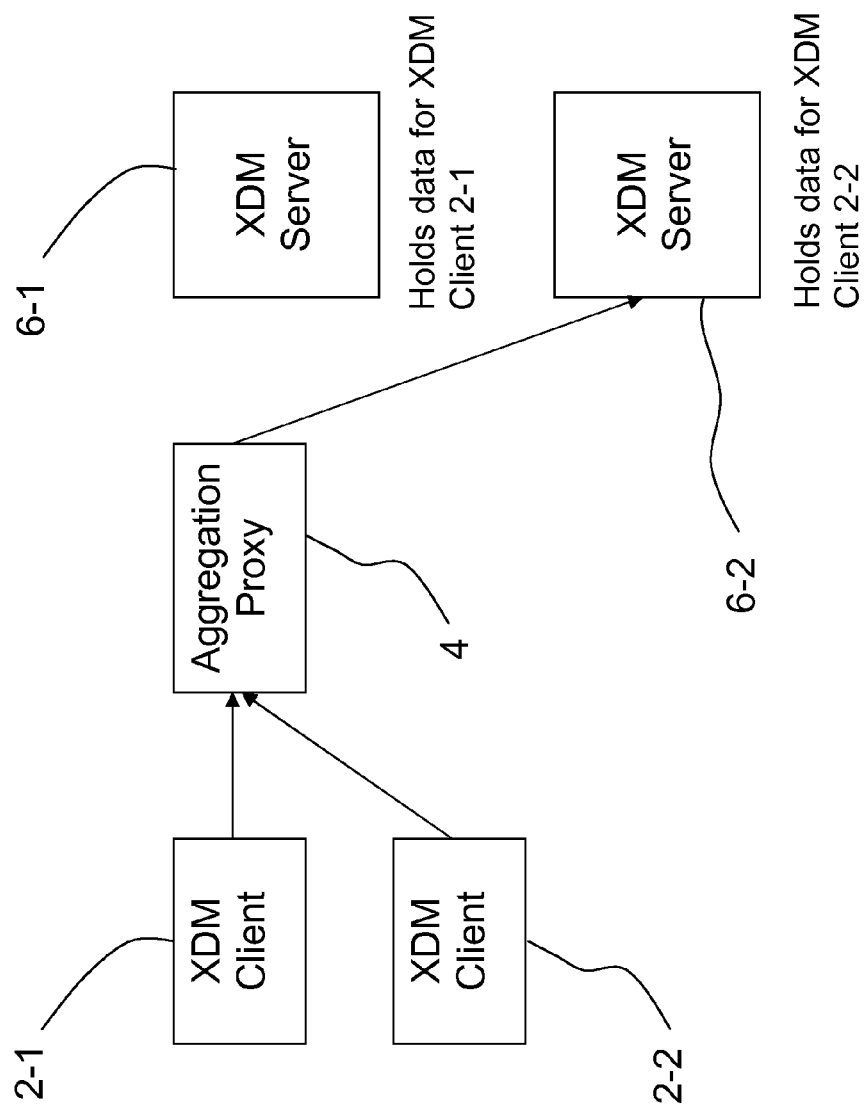
FIG. 1, referred to herebefore, is a schematic illustration showing network entities of the XDM Architecture as defined in OMA XDM 2.0.
Figure 2:
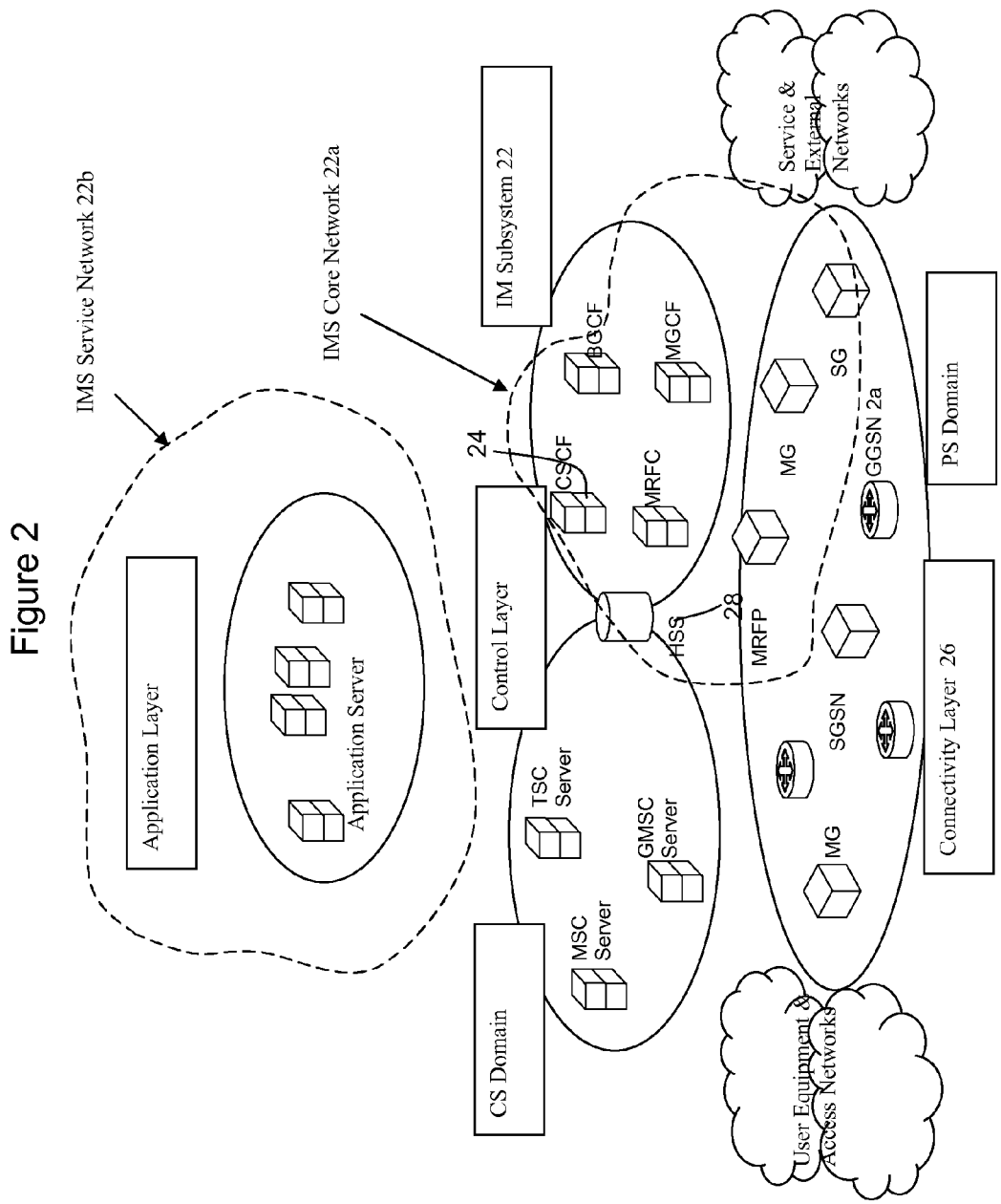
FIG. 2, referred to herebefore, is a schematic illustration showing an IMS network integrated with a GPRS/PS access network.
Figure 3:
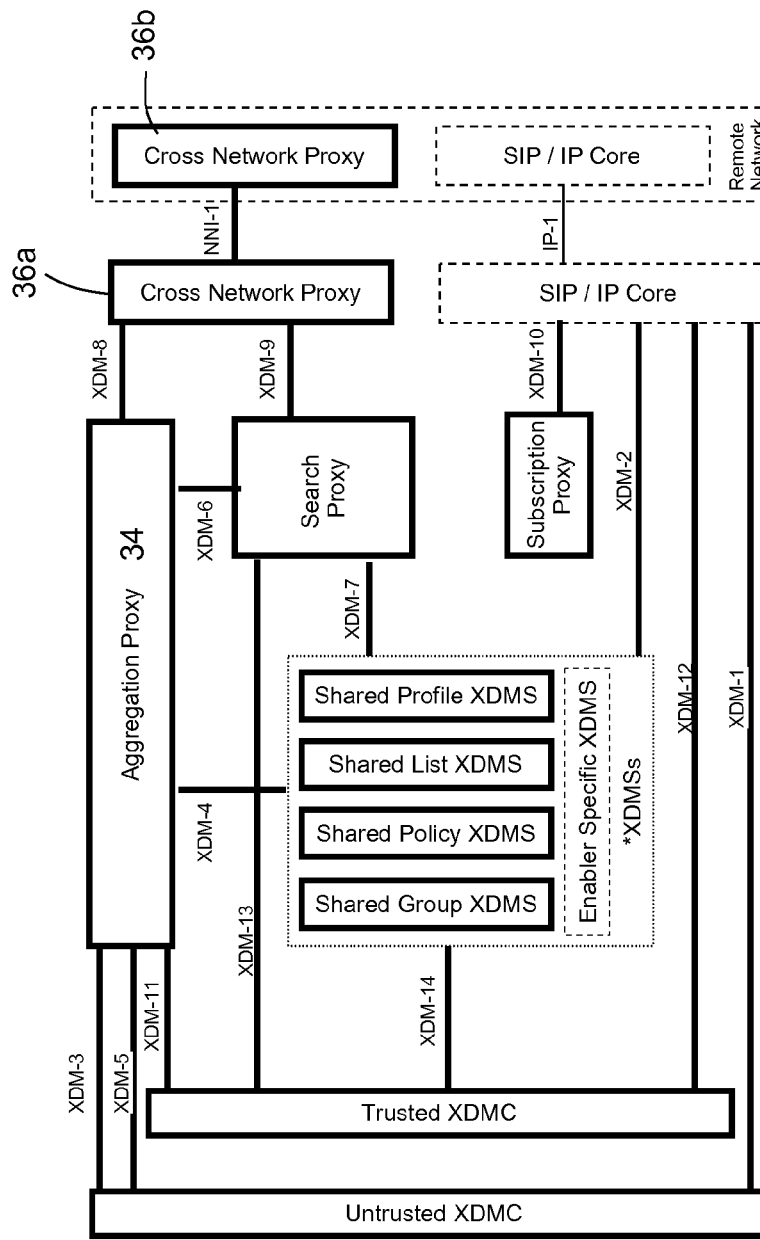
FIG. 3, referred to herebefore, is a more detailed schematic illustration showing the XDM Architecture.
Figure 4:
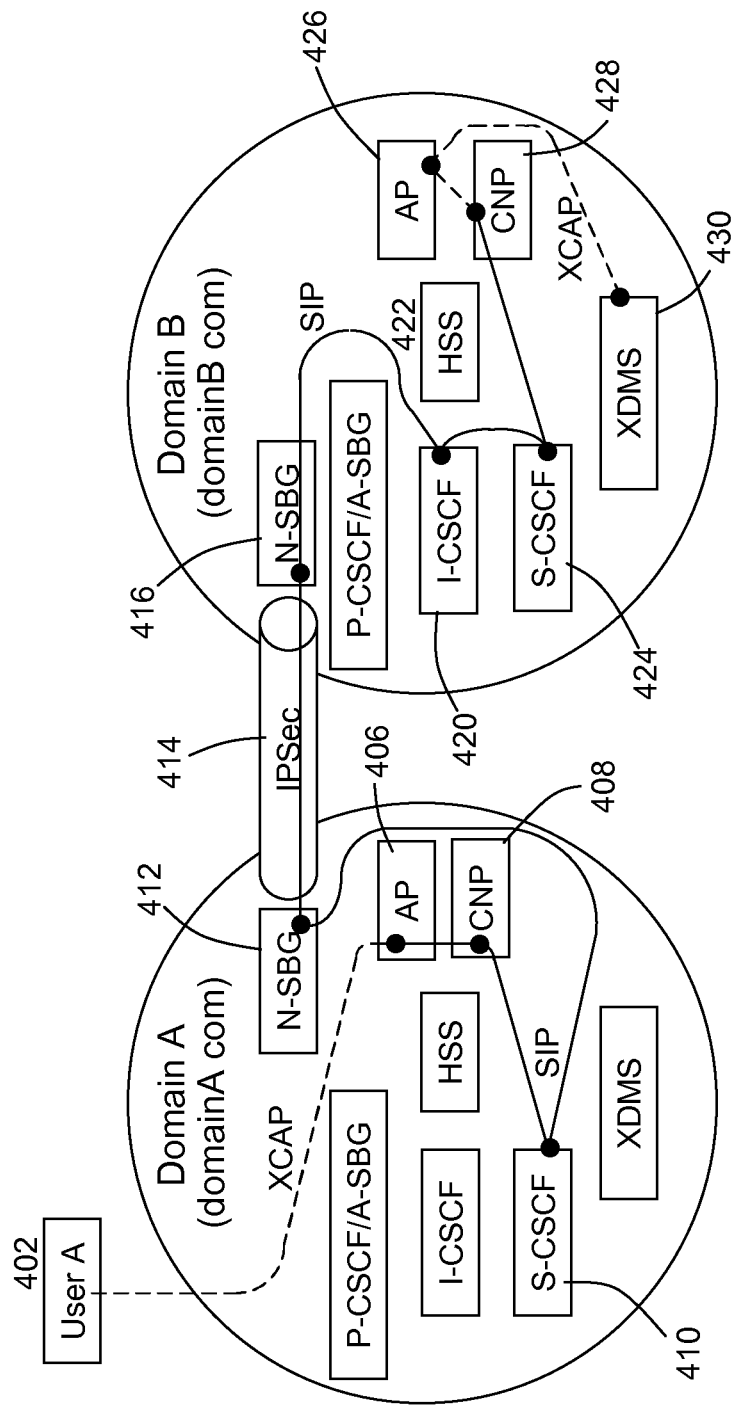
FIG. 4 is a schematic illustration of a system for a user to access an XDMS in a different network.

In one embodiment, illustrated in FIG. 4, an XCAP request from a user (User A) 402 is forwarded in the user's network (domain A) to the AP 406 in domain A. The AP 406, recognises that it is an XCAP request to access an XML document that resides in a different network, and forwards the XCAP request to a CNP-A 408 in domain A. Now, the CNP-A 408 is configured to create a SIP request, and forward this to the IMS core of the domain where the XDMS storing the requested XML document resides. In this embodiment, the SIP request is a SIP INVITE request to commence an SDP negotiation to establish a dialog session. The CNP-A 408 puts the identity of the remote document owner (e.g. sip:userX@domainX.com) in the request URI of the SIP message. This identity is part of the original XCAP request URI (i.e. it is the XUI. in the request—for example http://apserver/[AUID-value]/users/[XUI]/document. XUI may have the form of sip:user@domain or TEL:+46107190000). The CNP-A 408 also includes an IMS specific communication service indicator in the SIP message header. This SIP INVITE is forwarded, according to standard SIP signalling, via the S-CSCF 410 to the N-SBG 412 in Domain A. The SIP INVITE is then forwarded via the secure tunnel 414 (e.g. an IPSec tunnel, or whatever means is used for transporting SIP messages between the domains) to the N-SBG 416 in the remote network domain B, which will forward it on to the I-CSCF 420 in domain B. As this identity "sip:userX@domainX.com" is a normal identity, the I-CSCF 420 can refer to the HSS 422 in domain B, from which it obtains the SIP routing information it requires to route the request to an S-CSCF 424 and then to the CNP-B 426 in domain B. Based on the information in the SIP INVITE, including the service indicator, the HSS 422 provides trigger information (IFC) that tells the S-CSCF which SIP Application Server to invoke. Thus, If the service indicator is set to "XDM/XCAP" the request will be forwarded to the CNP-B 426.

The CNP-B 426 will check whether the request has come from a trusted network domain and if approved will continue the SDP negotiation to establish the session. The SDP body in the SIP INVITE is used to establish a media session (e.g. a TCP connection between CNP-A 408 and CNP-B 426). If the N-SBGs are TCP aware this TCP session may be set up form CNP-A to N-SBG 412 in domain A and from N-SBG 412 in domain A to N-SBG 416 in domain B and from N-SBG 416 in domain B to CNP-B 426. The N-SBGs do this by manipulating the SDP body that is sent in the SIP INVITE and the other SIP messages used to establish the SIP session (and the corresponding media session). By establishing the session a "user plane" connection is set up using the SDP body. This connection can then be used to transport the XCAP request sent by CNP-A 408 via the TCP connection to CNP-B 426.

The CNP-B 426 then receives the XCAP request and processes it in the normal way to access the XML document. The XCAP request is forwarded to the AP 428 in domain B, which can then access the requested XML document from the XDMS 430.

Figure 5:
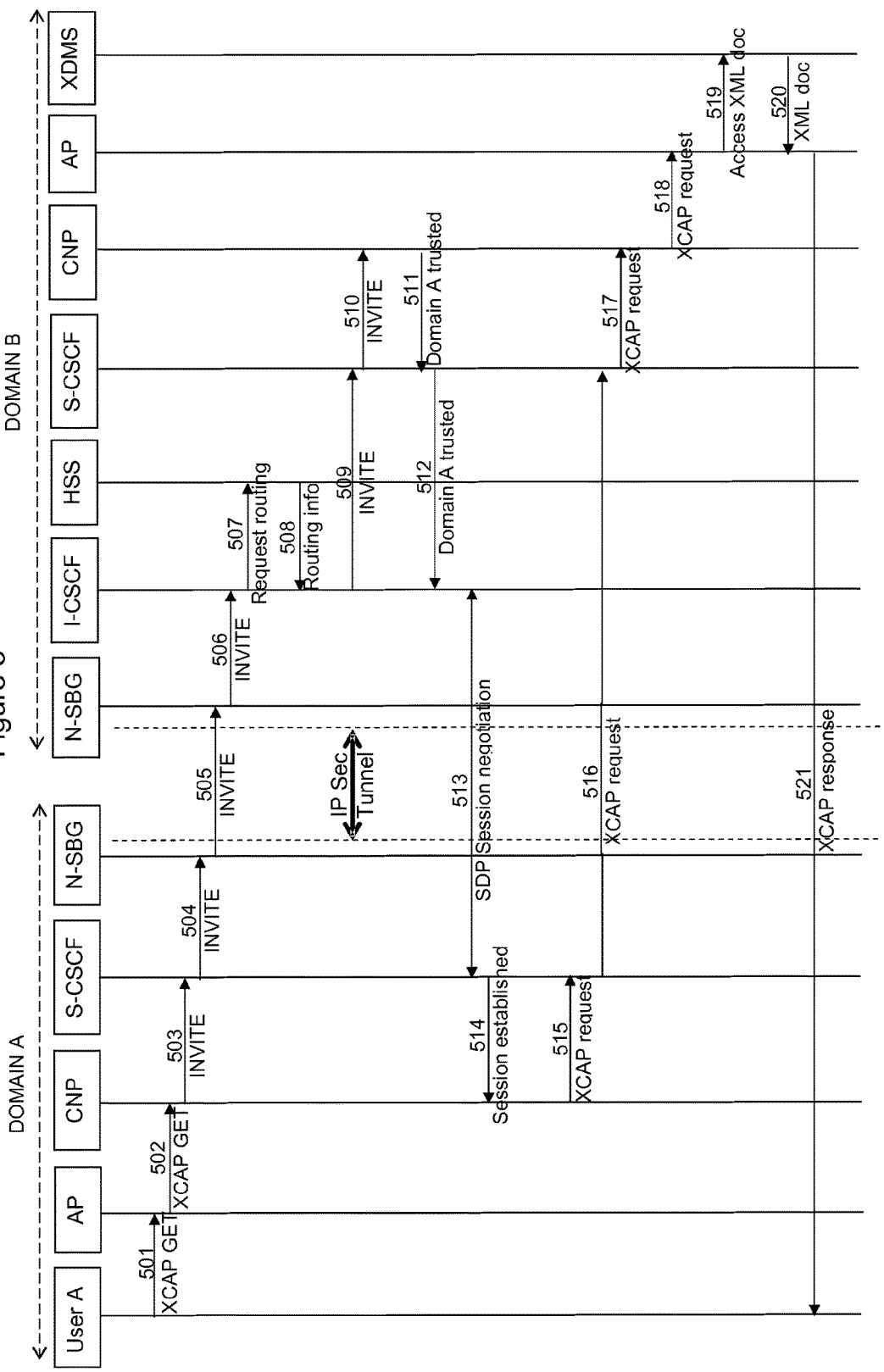
FIG. 5 is a signal flow diagram of one embodiment using the system of FIG. 4.

FIG. 5 illustrates the sequence of signalling between the network entities. At step 501, User A sends to the AP in domain A an HTTP/XCAP request to access an XML document in an XDMS in domain B, and this is forwarded at step 502 to the CNP, CNP-A, in domain A. CNP-A creates a SIP INVITE to establish a dialog session with the identity of the remote document owner inserted in the SIP INVITE URI, and sends this at step 503 to the S-CSCF in domain A, which routes it on via the N-SBG (step 504) in domain A, and the IP-Sec tunnel (step 505) to the N-SBG in domain B. The SIP INVITE is forwarded at step 506 to the I-CSCF in domain B. At step 507, the I-CSCF sends a request for routing information to the domain B HSS, which returns (step 508) the identity of the S-CSCF in domain B to which the SIP INVITE is to be sent. At step 509 the SIP INVITE is sent to the S-CSCF in domain B, and at step 510 this is forwarded to CNP-B. CNP-B checks that the request has come from a trusted IMS domain, and confirms this at step 512. At step 513 there follows the normal SDP session negotiation, and once the session has been established, this is confirmed at step 514 to CNP-A.

Now, at step 515 CNP-A forwards the XCAP request to the S-CSCF in domain A, and this is sent on using the established connection through to the S-CSCF in domain B (step 516) and on to CNP-B (step 517). At step 518, the CNP-B processes the HTTP/XCAP request and forwards this to the AP in domain B. At step 519 the AP accesses the XML document from the XDMS, and at step 520 the requested data is returned in an XCAP response, which is sent all the way back to User A (step 522) via the established connection path.

Figure 6:
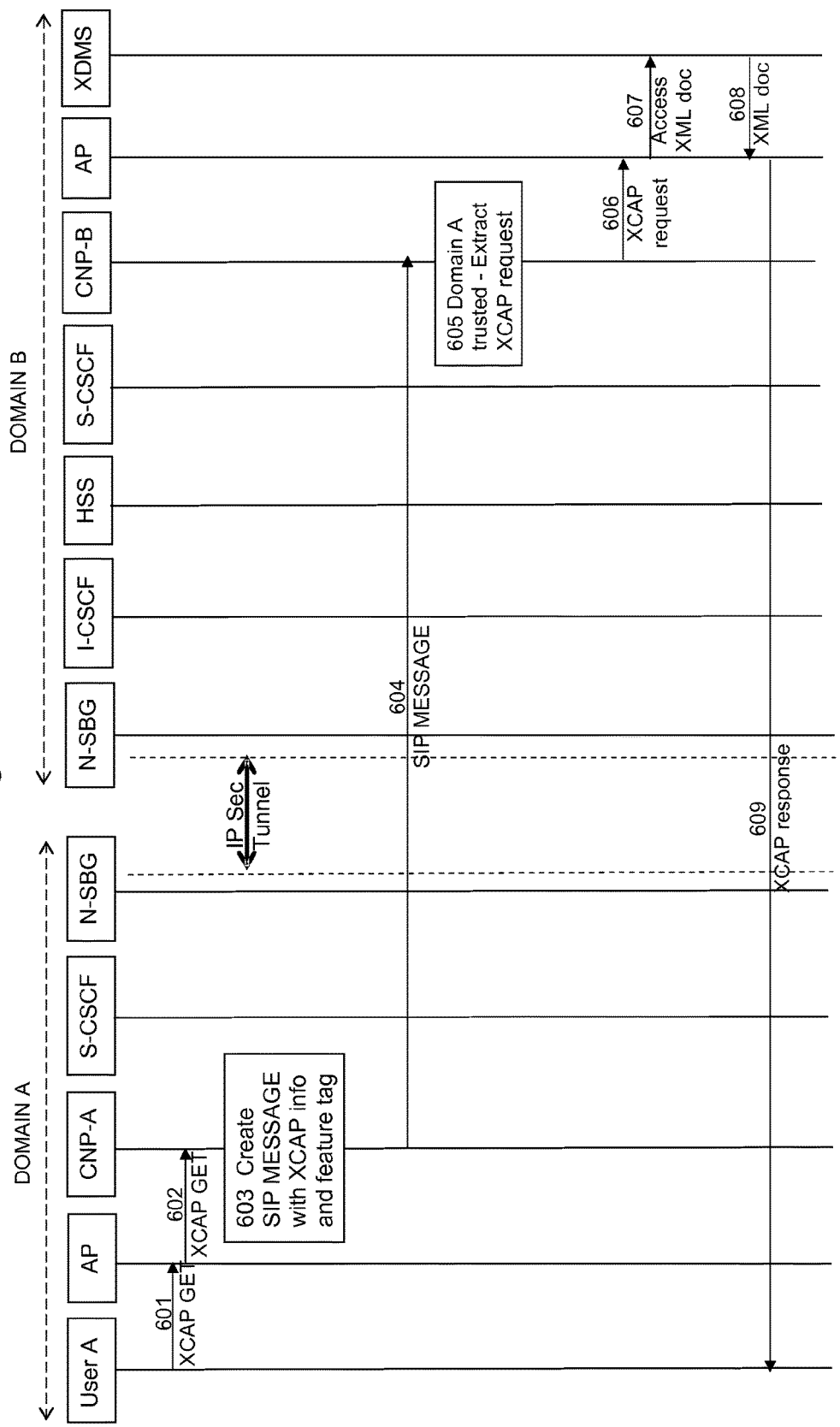
FIG. 6 is a signal flow diagram of another embodiment using the system of FIG. 4.

FIG. 6 illustrates the sequence of signalling between the network entities using an alternative approach, in which the XCAP request is embedded in a SIP MESSAGE request containing a specific feature-tag. In this approach the XML document is accessed without the need to establish a SIP session. As in the method described above and shown in FIG. 5, at steps 601 and 602 the User's XCAP request is sent to the AP in domain A and forwarded to CNP-A. Now, at step 603, CNP-A creates a SIP MESSAGE, as before incorporating the identity of the remote document owner in the URI of the SIP message. However, CNP-A also inserts a feature tag into the message, identifying it as a message that carries an XCAP request. CNP-A also embeds the HTTP/XCAP request information in the message. At step 604, this is forwarded (as in steps 503-510 of FIG. 5) to CNP-B in domain B. This time, CNP-B recognises the feature tag, and after checking that the request has come from a trusted network, proceeds to extract the HTTP/XCAP request information from the SIP MESSAGE to re-create the XCAP request (step 605). The method then proceeds as before to access the XML document at the XDMS (steps 606 to 608) and return the requested data to the user (step 609).

Note that in the embodiments described above the conversion of XDM/XCAP requests to SIP/SDP and vice versa are described as taking place in the CNPs in domains A and B, and the requests are routed to the CNPs. However, it will be appreciated that the same principles could be applied with the conversion being done at another entity, for example the AP. Also it could be possible for a SIP request to be routed to the XDMS, where the conversion back to the XCAP request takes place.

The solutions described above utilise the benefits of the SIP routing principles to find the remote CNP/AP/XDMS to send the XCAP/HTTP request to. As SIP is used there is no need to establish a separate security mechanism for HTTP/XCAP traffic over the NNI.

Figure 7:
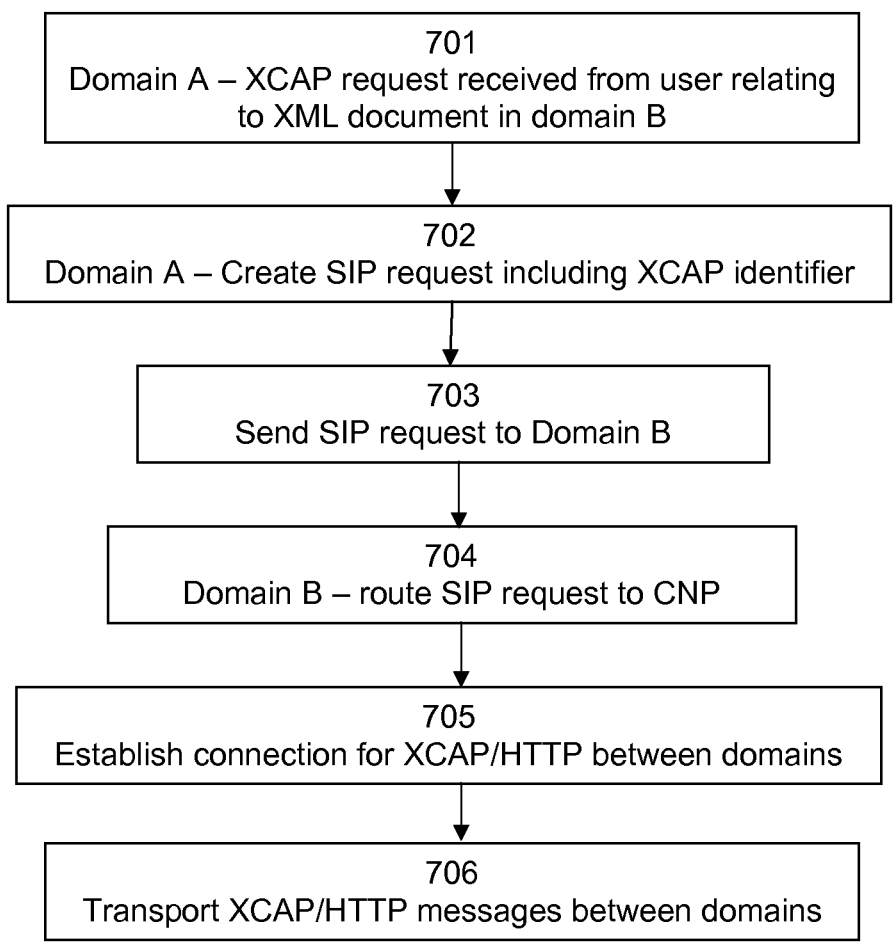
FIG. 7 is a flow chart illustrating the principal method steps.

FIG. 7 is a flow diagram illustrating an overview of the principal method steps. In step 701, an XCAP request is received in domain A from a user. The XCAP request relates to an XML document that can be accessed from a location in domain B (for example it is in an XDMS accessible via a CNP in domain B, as described above). At step 702, a SIP request is created. The SIP request includes information identifying it as a request that relates to XCAP. At step 703, the SIP request is sent to the second domain. Normal SIP routing procedures can then be used so that, as shown at step 704, the SIP request is routed to the location (CNP) in the second domain, based on the identifying information in the SIP request. As shown at step 705, a connection for XCAP messages is thus established between the first and second domains. At step 706 XCAP messages (e.g. requests or responses) are transported between the domains over the established connection.

Figure 8:
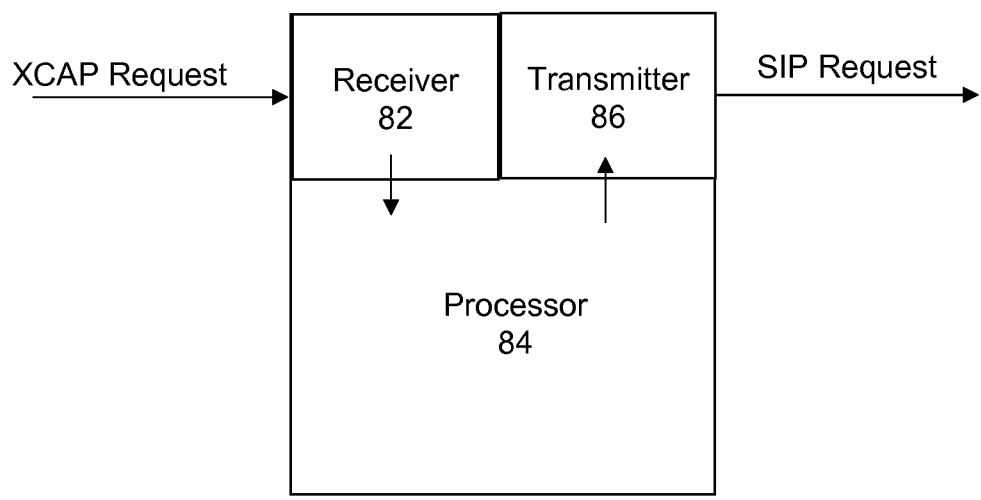
FIG. 8 is a schematic illustration of an IMS network node that handles an incoming XCAP or other XDM request.

FIG. 8A is a schematic illustration of the IMS network entity, or node 80, that handles the incoming XCAP or other XDM request. The request is received in a receiver 82 of the node and is recognised as relating to an XML document another IMS network. The request is passed to a processor 84, which creates a SIP request, inserting the information that identifies the SIP request as one that relates to an XDM request. The SIP request is then forwarded via a transmitter 86 in the node 80 for sending to the other IMS network.

The system may be configured to wait to establish a SIP session before sending the XDM request as part of the session dialog. In that case, the processor 84 will wait for confirmation of the established session before sending the request. Alternatively, if no SIP session is required, the processor 84 creates a SIP MESSAGE and embeds the XDM request into the SIP message.

Figure 9:
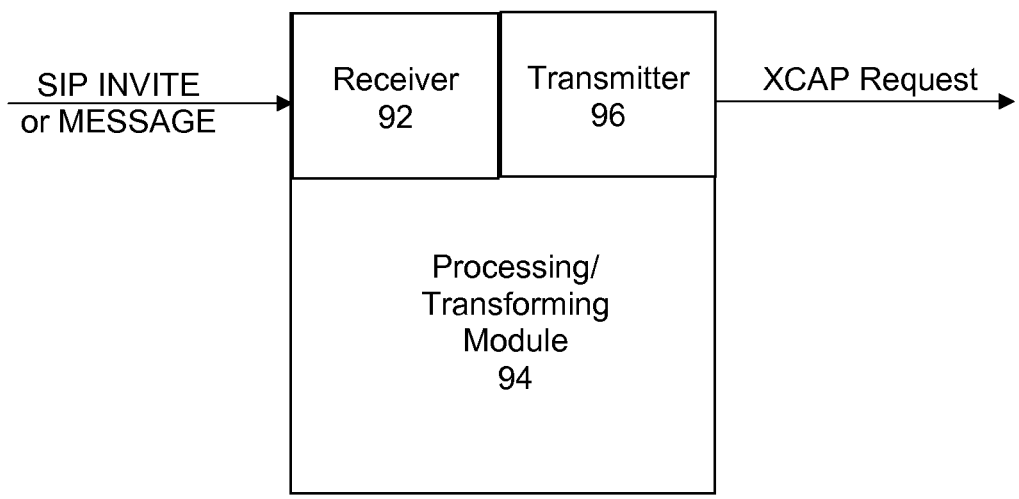
FIG. 9 is a schematic illustration of the IMS network node that handles an incoming SIP MESSAGE or INVITE sent from another IMS domain.

FIG. 9 is a schematic illustration of the IMS network node 90, that handles the incoming SIP MESSAGE or INVITE sent from another IMS domain. In one configuration the SIP MESSAGE carries an XDM request for access to an XML document from a location in the IMS network. The SIP MESSAGE is received at a receiver 92 of the node 90, and is forwarded to a transforming module 94, where the XDM request is extracted from the SIP MESSAGE. The XDM request is then forwarded via a transmitter 96 of the node 90 to the location in the network from which the XML document is accessed.

In another configuration, the SIP INVITE relates at an XDM request from the other network to access an XML document and includes a request to establish a SIP session. The SIP INVITE is received at a receiver 92, and is forwarded to a processor/transforming module 94, which is configured to respond to the SIP INVITE so as to set up the SIP session. The receiver 92 also receives the XDM request after the session has been established. The XDM request is then forwarded via a transmitter 96 of the node 90 to access the XML document.

The invention claimed is:

1. A method of communication for XDM requests between first and second IMS network domains, the method comprising:
   receiving an XDM request in the first domain, the XDM request comprising a request for access to an XML document from a location in the second domain;
   creating a SIP request, the SIP request including information identifying it as a request that relates to an XDM request; and
   sending the SIP request to the second domain so that the SIP request can be routed to the location in the second domain, based on the identifying information in the SIP request and thereby establish a connection for XDM requests between the first and second domains;
   wherein the SIP request is a SIP INVITE MESSAGE comprising a request to establish an SDP negotiated SIP session between the first and second IMS network domains;
   wherein the SIP INVITE MESSAGE comprises an IMS service indicator indicating that the SIP request relates to the XDM request; and
   wherein the XDM request is sent to the location in the second domain using the SIP session that has been established.

2. The method of claim 1, wherein the SIP session uses a secure communication tunnel for SIP signalling between the first and second domains.

3. The method of claim 2, wherein the secure communication tunnel is one of an XCAP/XDM tunnel between Cross-Network-Proxy nodes in each of the first and second domains, a TCP tunnel, an IPsec tunnel, an SSH tunnel, and an MSRP tunnel.

4. The method of claim 1, wherein the information identifying the SIP request as a request that relates to an XDM request comprises a feature tag.

5. The method of claim 1, wherein the XDM request is extracted from the SIP request in the second domain and forwarded to the location in the second domain from which the XML document can be accessed.

6. The method of claim 1, wherein the SIP request includes an identifier of an owner of the XML document.

7. The method of claim 1, further comprising retrieving the XML document and returning it to the first domain in an XDM response.

8. The method of claim 1, wherein the XDM request received in the first domain is forwarded to a Cross-Network-Proxy (CNP) in the first domain, the Cross-Network-Proxy creating the SIP request.

9. The method of claim 1, wherein the location in the second domain to which the SIP request is routed is an Aggregation Proxy (AP) or an XDMS.

10. The method of claim 1, wherein the location in the second domain to which the SIP request is routed is an AP or an XDMS.

11. A node of a first IMS network comprising:
a receiver configured to receive an XDM request comprising a request for access to an XML document
from a location in a second IMS network;
a processor configured to create a SIP request, wherein the SIP request includes information identifying it as a request that relates to an XDM request, and
a transmitter configured to send the SIP request to the second IMS network;
wherein the SIP request is a SIP INVITE MESSAGE comprising a request to establish an SDP negotiated SIP session between the first and second IMS network domains; and
wherein the SIP INVITE MESSAGE comprises an IMS service indicator indicating that the SIP request relates to the XDM request; and
wherein the XDM request is sent to the location in the second domain using the SIP session that has been established.

12. A method of operating a node of a first IMS network, comprising:

receiving a SIP request, the SIP request including information identifying it as a request that relates to an XDM request;
establishing a connection for XDM requests between the first IMS network and a second IMS network;
receiving an XDM request comprising a request for access to an XML document from a location in the first domain; and
forwarding the XDM request to the location in the first domain to access the XML document;
wherein the SIP request is a SIP INVITE MESSAGE comprising a request to establish an SDP negotiated SIP session between the first and second IMS networks;
wherein the SIP INVITE MESSAGE comprises an IMS service indicator indicating that the SIP request relates to the XDM request; and
wherein the XDM request is received in the first IMS network using the SIP session that has been established.

13. A node of a first IMS network, comprising:
a receiver configured to receive a SIP request, the SIP request including information identifying it as a request that relates to an XDM request;
a processor module configured to establish a connection for XDM requests between the first IMS network and a second IMS network;
the receiver being further configured to receive an XDM request comprising a request for access to an XML document from a location in the first domain; and
a transmitter configured to forward the XDM request to the location in the first domain to access the XML document;
wherein the SIP request is a SIP INVITE MESSAGE comprising a request to establish an SDP negotiated SIP session between the first and second IMS networks;
wherein the SIP INVITE MESSAGE comprises an IMS service indicator indicating that the SIP request relates to the XDM request; and
wherein the XDM request is received in the first IMS network using the SIP session that has been established.

* * * * *